United States Patent
Morgan

(10) Patent No.: US 6,851,352 B2
(45) Date of Patent: Feb. 8, 2005

(54) COVERED DUAL CONCENTRIC DOME MOLD

(76) Inventor: Fletcher Morgan, 4990 Coquina Key Dr., SE., St. Petersburg, FL (US) 33705

( * ) Notice: Subject to any disclaimer, the term of this patent is extended or adjusted under 35 U.S.C. 154(b) by 81 days.

(21) Appl. No.: 10/330,221

(22) Filed: Dec. 30, 2002

(65) Prior Publication Data

US 2004/0099148 A1 May 27, 2004

Related U.S. Application Data

(63) Continuation-in-part of application No. 10/302,903, filed on Nov. 25, 2002.

(51) Int. Cl.[7] ................................................ A47J 43/18
(52) U.S. Cl. .............................. 99/428; 99/439; 99/442
(58) Field of Search ........................ 99/428, 439, 442, 99/440, DIG. 15, 349, 353; 249/175, 176, 177, DIG. 1

(56) References Cited

U.S. PATENT DOCUMENTS

| | | | |
|---|---|---|---|
| 1,487,906 A | | 3/1924 | White et al. |
| 1,852,966 A | | 4/1932 | Green |
| 2,156,145 A | * | 4/1939 | CaVett et al. ................. 99/439 |
| 2,595,684 A | * | 5/1952 | Lyons .......................... 99/433 |
| 3,141,400 A | | 7/1964 | Powers |
| 3,296,956 A | | 1/1967 | Turner |
| 3,831,507 A | | 8/1974 | Wheaton |
| 4,812,323 A | | 3/1989 | Savage |
| 5,226,352 A | | 7/1993 | Savage |
| 5,528,981 A | * | 6/1996 | Pettit ........................... 99/428 |
| 5,948,313 A | | 9/1999 | Cahen |

* cited by examiner

Primary Examiner—Reginald L. Alexander
(74) Attorney, Agent, or Firm—John S. Hale; Gipple & Hale

(57) ABSTRACT

An apparatus assembly for forming a compound dessert in a predetermined dome shape including a first outer mold having a dome shaped bowl with a closed semi-spherical end and an open end, and a ring shaped support base secured to said closed end of bowl body. A cover including a second dome shaped bowl of a smaller diameter is mounted in the chamber formed in the first mold bowl and the cover is mounted to an extended portion of the outer mold.

20 Claims, 7 Drawing Sheets

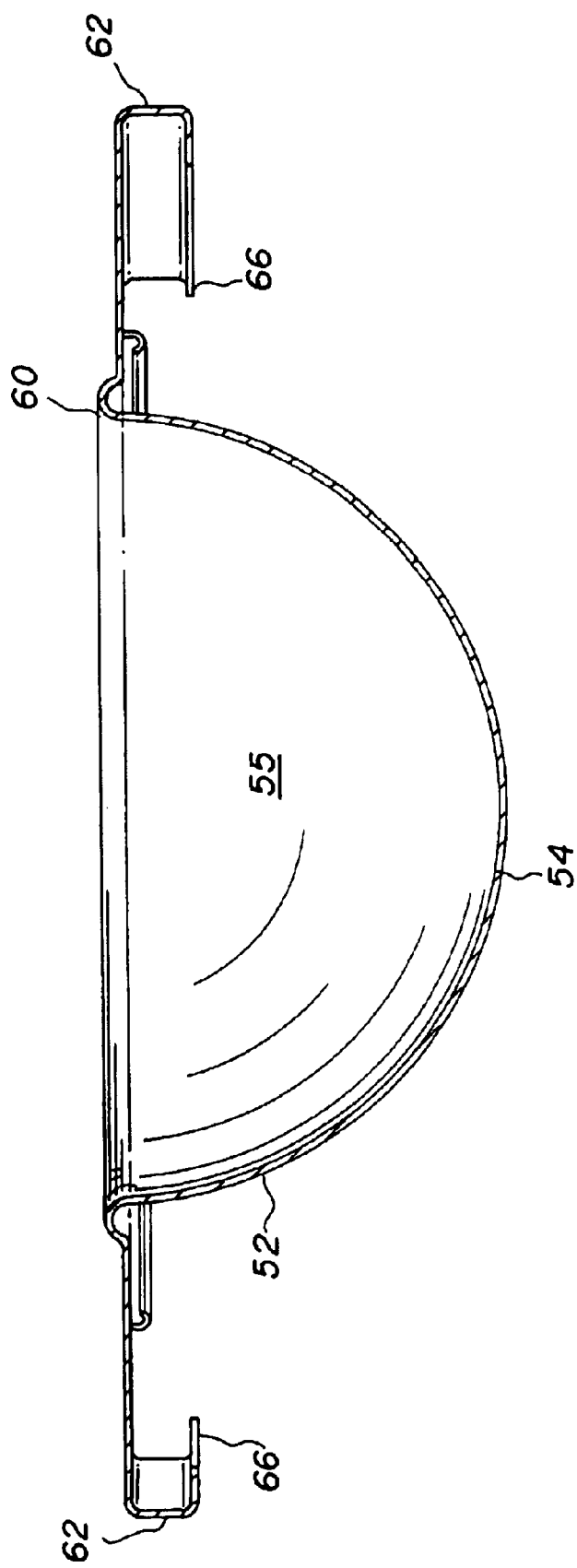

COVERED DUAL CONCENTRIC DOME MOLD

CROSS-REFERENCE TO RELATED APPLICATIONS

This is a continuation-in-part application of U.S. patent application Ser. No. 10/302,903 filed Nov. 25, 2002.

TECHNICAL FIELD OF THE INVENTION

The present invention relates generally to the field of cake baking and desert molds. More particularly, the present invention concerns a covered apparatus for baking a domed, semi-spherical or hemispherical cake or molded dessert having nested concentrically shaped components. The present invention thus relates to an apparatus assembly for baking a shaped type of dessert that can be termed a covered dual domed hemispherical or semi-spherical dome cake and/or combination dessert mold.

The present invention is thus directed toward an apparatus for molding cake batter, ice creams, gelatins or other desserts into a particular outer hemispherical shape with an inner separate mold having a smaller concentric hemispherical shape while setting or being baked. The invention particularly concerns a dome assembly which molds and/or bakes cakes or desserts in the shape of a hemispherical dome having a second inner composition shaped as a hemispherical dome.

BACKGROUND OF THE INVENTION

Food molds are well known in the prior art. A common baking pan is a food mold, with one open end, one closed end and a peripheral side wall. The closed end and side wall define a hollow volume that becomes the three-dimensional shape of a food product molded by the baking pan.

Some food pans, such as a baking pan for making angel food cake, have an annular hollow volume at the open end. The hollow volume is filled with a food composition and then baked. After baking, the pan is inverted to remove the shaped food composition from the open end. Thus, the open end is used to form the bottom of the final food product.

Some food molds have a centrally located indentation at the closed end. With a mold of this type, a first food composition may be placed and formed in the open end and a second food composition may be placed in the complementary shaped indentation at the closed end. This provides an accurate fit for the second filler food composition within the first supporting food composition.

It can thus be seen that a number of devices have been used in the molding and baking of desserts to obtain molded desserts in a variety of configurations and for a variety of shaped configurations as described in the prior art. However covered dual domed desserts are rare because of the complexity in preparing same. While cakes are commonly referred to in the literature as being domed, in effect this is an occurrence which comes about as the batter expands during baking and does not equate to a hemispherical or semispherical shaped cake.

Historically, it was known in the prior art to bake bread bowls which were semi-spherical loaves of bread into which a cavity was carved for placement of salads or soups. A conventional bread bowl is typically made by forming raw bread dough on the top of a simple inverted bowl which is then placed into the oven for baking. Bread bowls made in this manner often rise from the inverted bowl so that the same presents an uneven appearance, requiring trimming and waste.

Hemispherical shaped or dome cakes having dual composition are popular in Italian dessert cooking and are generally known as "Zuccotto". These cakes are prepared by slicing previously baked sponge cake (Pan di Spagna) into thin, vertical slices, lining the interior of a bowl with plastic wrap and lining the plastic wrap in the bowl with overlapping pieces of the sponge cake slices. The slices of cake are then sprinkled with liquor and the dampened assembly is then covered with a plastic wrap and refrigerated. A center mixture of chocolate or other filling is poured into the cake lined bowl and the bottom or exposed surface of the filling is covered with other slices of cake. The entire cake is allowed to set for a number of hours, preferably overnight, inverted onto a platter and dusted with confectioners sugar. As can be seen, the process for making this cake is quite laborious in time and resources required. It has been found desirable to mold or form desserts or cake into a layered hemispherical or semi-spherical dome shape which can be baked and/or frozen and marketed as a specialized cake shape similar to that of the Italian "Zuccotto" cakes as the same make an elegant presentation.

Many prior art devices and techniques mold and bake dough of breads, batters of cakes, cookies, and other baked goods into various shapes including containers which may be used to hold other foods. For example, U.S. Pat. No. 4,812,323, issued Mar. 14, 1989, discloses a method for molding and baking cookie dough into a cup shape which can then be used to hold ice cream or other fillings in a similar manner to U.S. Pat. No. 3,296,956, issued Jan. 10, 1967, which also discloses a molding and baking apparatus for the baking of bread dough into a cup-like shape. U.S. Pat. No. 1,487,906, issued Mar. 25, 1924, discloses a pan for baking cake batter into a container shape for holding ice cream.

In U.S. Pat. No. 3,141,400 issued Jul. 21, 1964 a telescoping cake apparatus is disclosed with a center cone assembly which moves upward when the cake batter is baked forming a frustrum conical cake with a conical center cavity. A one piece strip cross link handle is secured to the upper edge of top of the expendable baking section and the cone by staples or the like.

A baked layered product with an apparatus for making same is shown in U.S. Pat. No. 3,831,507, issued Aug. 27, 1974. This baking assembly uses three baking pans to form a cylindrical bunt bowl body and lid which is placed over the body to hold the filling therein.

Similarly U.S. Pat. No. 1,852,966 issued Apr. 5, 1932 is directed toward a baking pan used for baking a cake with a hollow center so that the same can have a filling placed therein. A tapered tubular outer member has a core mold mounted thereon attached to a cover over the top of the tubular outer member.

U.S. Pat. No. 5,948,313, issued Sep. 7, 1999 is directed toward a mold assembly for making a baked edible shell. The mold assembly is constructed of an outer mold shell and an associated inner mold shell, the outer mold shell having a curved main portion with a central opening and an outer rim extending in a plane. The inner mold shell has a curved main portion with a central chimney shaped to pass through the outer mold central opening. The outer mold opening comprises a raised circular rim with an inwardly directed flange. The outer edge of the outer mold shell is formed with a rolled-up rim. When the edible material is being cooked, a metal strip with curved ends is mounted over the rolled rim of the outer shell mold as seen in FIGS. 4 and 5C to hold both mold shells in relative positions to eliminate expansion of the edible material during cooking.

Another reference, U.S. Pat. No. 5,226,352 issued Jul. 13, 1993 directed toward a baking assembly which has an outer dome shaped member and an inner dome shaped member as shown in FIGS. 6 and 7. A flange extends outward from the upper edge of the outer dome member to seat the flange extending from the upper edge of the inner dome member. The flanges are held together by a C clamp or other fastening means. The inner dome shaped member is TEFLON* coated on its inside surface and outside surface allowing cake or dough to be baked in the outer dome mold and the inner mold.

In all baking pans, it is desirable to facilitate the partial escape of moisture from these apparatuses in order to develop a degree of porosity in the final baked product. At the same time, however, the batter must absorb some moisture to prevent excessive dehydration. It therefore becomes necessary to contain the batter at a pressure sufficient to limit the extent to which water is converted to steam, since the batter absorbs steam less easily than water, while allowing for a degree of conversion and escape. The batter must also be contained to prevent the escape of the cake itself due to its expansion during baking.

The present invention also solves the complex construction problems in assembling a domed cake or dessert through the use of a simple apparatus with an easy snap on cover.

SUMMARY OF THE INVENTION

The present invention is directed toward an apparatus for simultaneously producing a covered dual layered semispherical or hemispherical dessert or cake using an outer dome shaped bowl with a ring shaped base and an inner dome shaped bowl which is supported in the outer dome shaped bowl cavity by a cover which is fastened to the handles on the outer bowl by rotating the same over handles. Both the cover and the outer dome shaped bowl have handles extending therefrom allowing the same to be easily grasped and handled by the user. The combined cake sections from each of the outer and inner dome shaped bowls are stacked to form a covered dual semi-spherical or hemispherical configuration.

It is an object of the invention to prepare two different composition food products into a single hemispherical shaped presentation.

It is another object of the invention to provide a cooking assembly for baking a cake that produces a uniformly shaped dome shaped cake with an internal composition of a similar but smaller shape that is resistant to tilting and rolling.

It is still another object of the invention to provide a cooking assembly which delivers heat energy evenly to all areas of the cake batter being baked while covering the cake batter in the outer bowl.

Yet another object of the invention is to provide an apparatus that is easy to use, ruggedized and reliable.

It is a further object of the invention to mold cake batter or a dessert composition in an enclosure of a desired shape and bake or set the enclosure composition while maintaining heat and pressure at a precise desired level.

It is yet another object of the invention is to provide an cooking assembly which is easily broken into individual components and is easy to clean.

Another object of the invention is to provide a cooking assembly for simultaneously baking two hemispherical cakes of different sizes with one cake fitting into a cavity formed during the baking process in the outer cake to produce a uniform cake that is predictable and reproducible without size variance.

Still another object of the invention is to provide a cooking assembly that has one or more of the characteristics discussed above but which is relatively simple to use and requires a minimum of cooking skills.

In the accompanying drawings, there is shown illustrative embodiments of the invention from which these and other objectives, novel features and advantages will be readily apparent.

These and other objects, advantages, and novel features of the present invention will become apparent when considered with the teachings contained in the detailed disclosure along with the accompanying drawings.

BRIEF DESCRIPTION OF THE DRAWINGS

FIG. 10 is a cross sectional view of the cover and integrally formed inner bowl component taken along line B—B of FIG. 8;

DETAILED DESCRIPTION OF THE INVENTION

The preferred embodiment and best mode of the invention is shown in FIGS. 1 through 13. "Batter" as used herein in the application is meant to encompass cake batter, dough, malleable ice cream, gelatin or a malleable dessert which sets up in a rigid or semi-rigid shape.

Referring to the Figures, a molding or baking assembly 20 according to the invention is adapted to shape or mold cake batter, other compositions of baking goods or complimentary desserts such as ice cream, gelatins, puddings into a concentric domed layered dessert having a semispherical or hemispherical shape.

Figure 1:
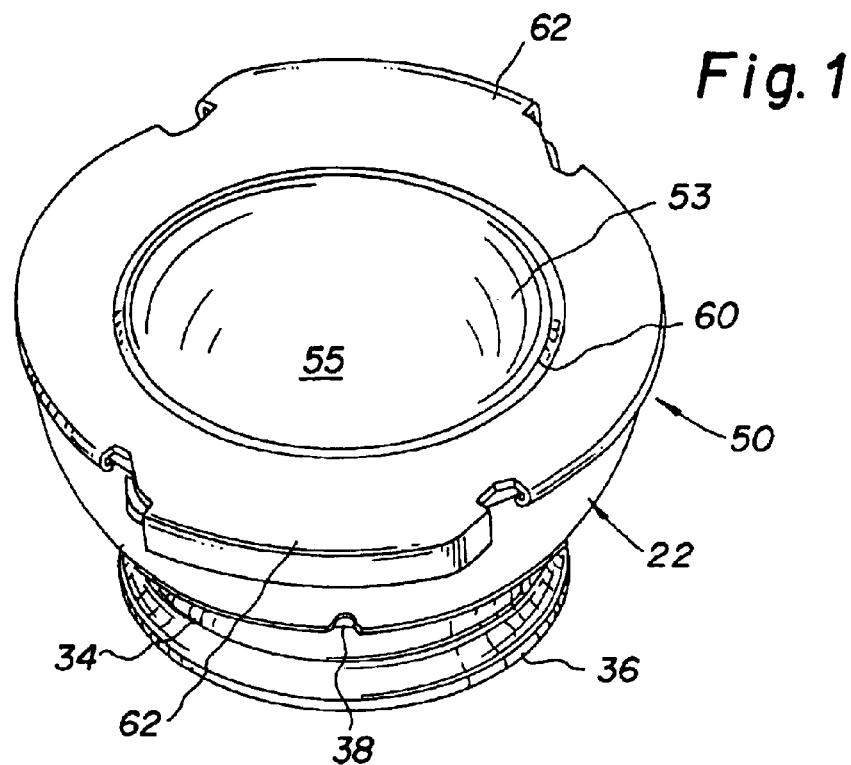
FIG. 1 is a perspective view of the covered dual concentric dome bowl apparatus of the present invention.
Figure 2:
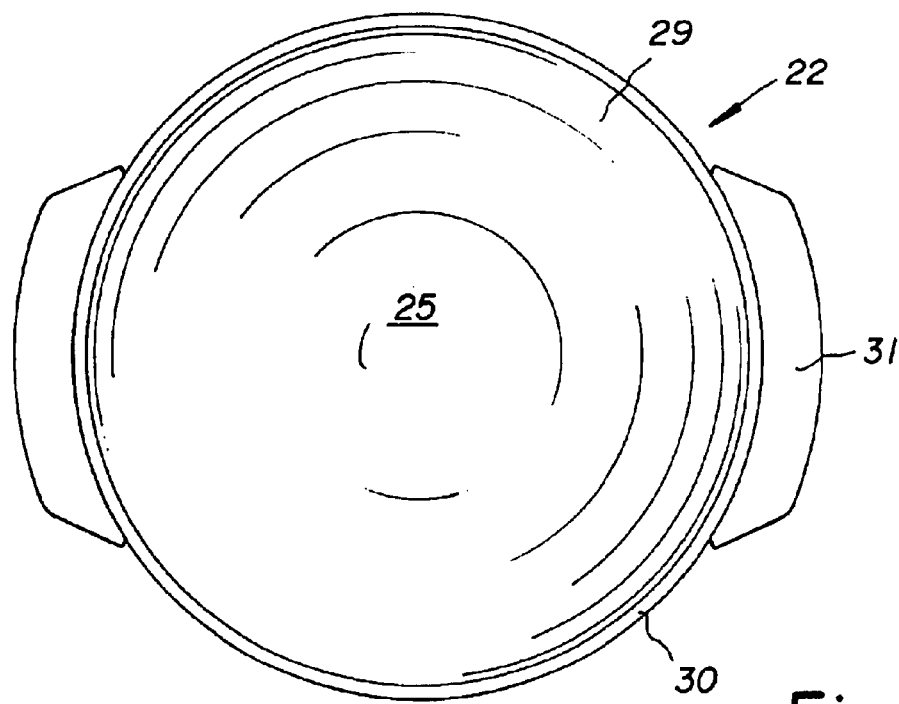
FIG. 2 is a top plan view of the outer dome bowl component of FIG. 1.
Figure 3:
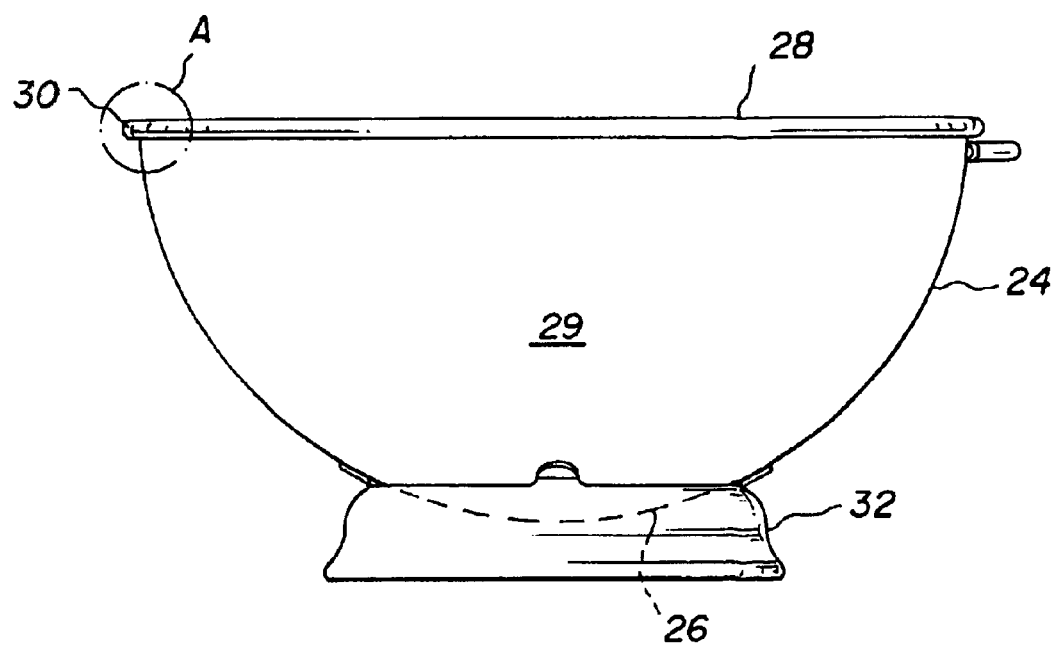
FIG. 3 is a front elevational view of the outer dome bowl component of FIG. 1 with a portion of the ring base shown in phantom.
Figure 4:
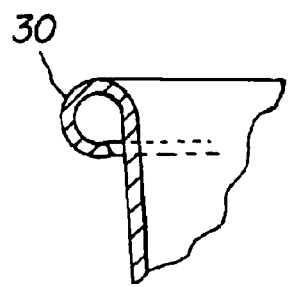
FIG. 4 is an enlarged cross sectional view of the outer bowl rim taken from circle A of the outer bowl component of FIG. 2.
Figure 7:
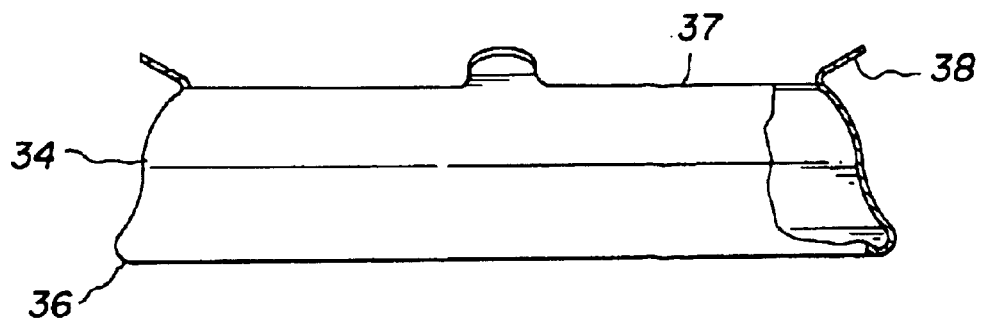
FIG. 7 is a partial side elevational view and cross section taken along line 7'—7' of the base ring shown in FIG. 6.
Figure 5:
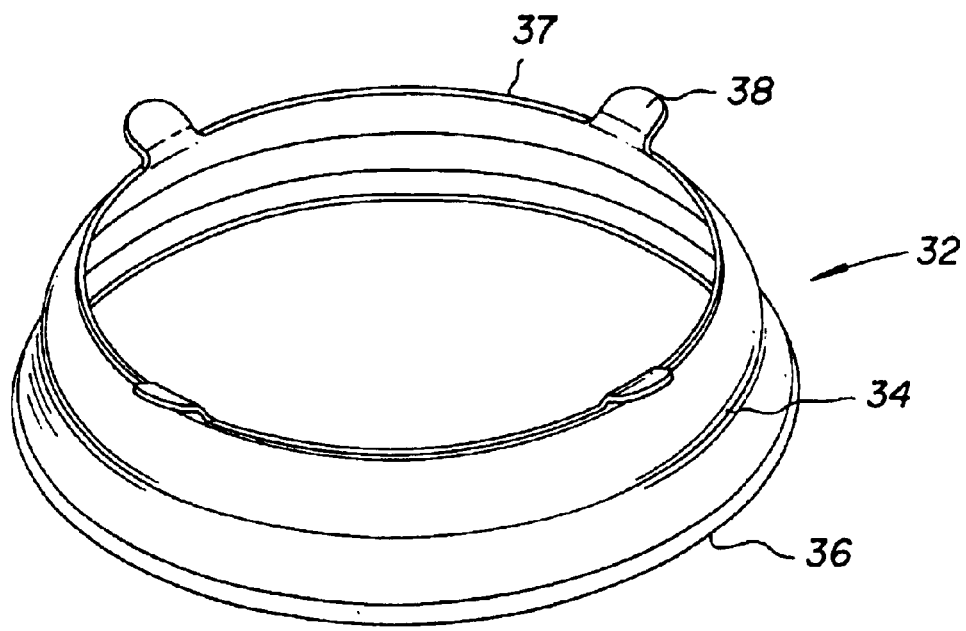
FIG. 5 is an enlarged perspective view of the base ring of the outer bowl dome component of FIG. 2 removed from the outer bowl dome.
Figure 6:
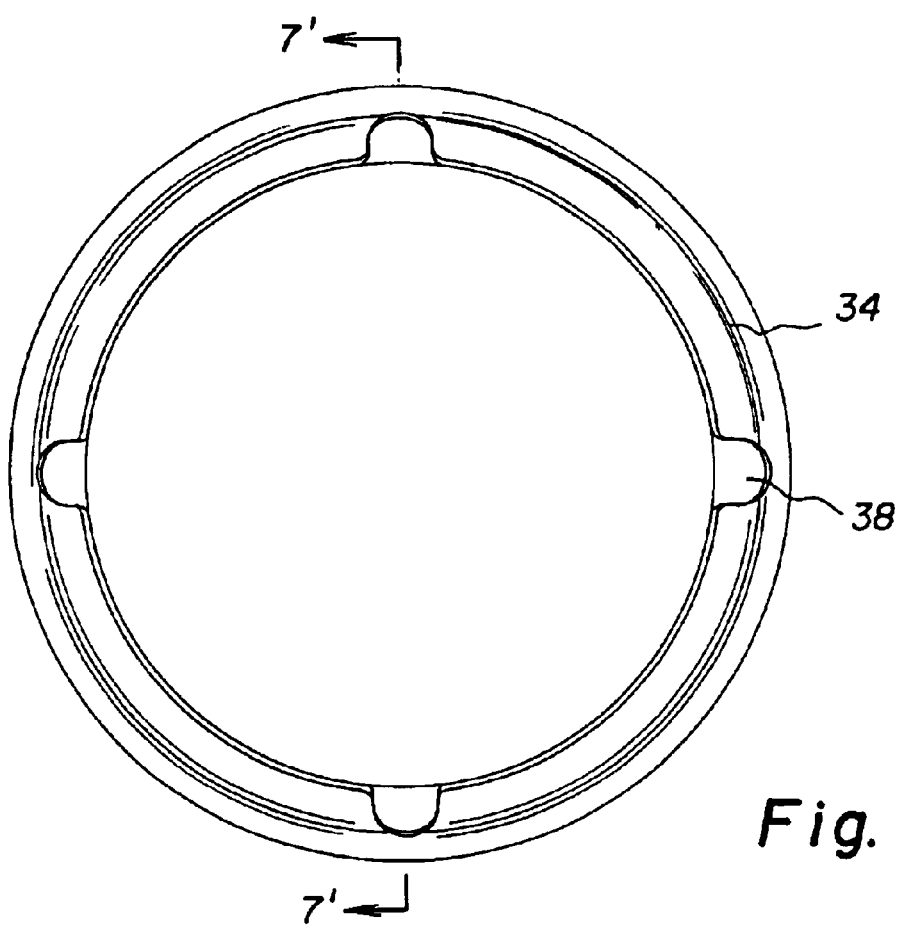
FIG. 6 is a top plan view of the base ring shown in FIG. 5.

The outer dome pan or bowl 22 is typically symmetrical with a concavo-convex spherical shape. The outer dome mold is constructed with a bowl body 24 having a spherical or curved closed bottom surface 26 and an open end 28 forming an interior chamber or cavity 29. The open end 28 is formed with a curved or rolled outer lip or rim 30 as shown in FIGS. 2 and 4 and has two handles 31 secured to the exterior of the outer dome bowl extending outward from the rim opposite each other. The outer lip 30 is curved in a circular configuration and preferably has a diameter of about 0.25 inches.

A base ring member 32 is secured to the bottom surface 26 of the bowl body 24 to provide a flat base surface during working and/or cooking. The ring member 32 is preferably constructed of 22 gage C1018 cold rolled steel with a bell shaped exterior surface having a side wall 34 having a curved bottom edge 36 and a planar top edge 37 which has four tabs 38 outwardly extending therefrom bent at an angle ranging from about 120° to 130°, preferably about 124°. The ring member 32 is secured to the base section of the bowl body 24 by welding or braising. Each tab 38 is positioned on the ring circumference 90° from the other adjacent tabs located on the circular top edge 37 and has a length of approximately 1 inch. The base ring 32 preferably has a diameter of 4.25 inches and a height of about 1.07 inches when used with a 8.38 inch outer diameter bowl having a depth of 3.98 to 4.0 inches. When ring member 32 is mounted or secured to the bowl body 24, there is a clearance ranging from about 0.40 to about 0.60 inches, preferably about 0.47 inches from the lowest outer bottom surface of the bowl to the top of the support area upon which the ring member 32 is seated.

If desired, a bimetallic thermometer can be attached to the ring member 32 which thermometer would turn an appropriate color upon reaching the desired cooking temperature allowing the cook to ascertain that the desired temperature has been reached.

The bowl body 24 and base ring 32 is preferably integrally constructed of sheet steel or stainless steel but can be constructed of copper, aluminum, cast iron, pyrex, glass, porcelain, ceramic or any type of microwaveable material at a uniform desired thickness commonly used for baking pans and containers. If desired, the bowl body can have its external surface coated with a non-corroding material such as tin or chromium. The bowl 24 therefore may be constructed of a single sheet of metal formed into the desired shape. The inside smooth surface 25 of the bowl is preferably coated with one or more nonstick coatings, such as for example TEFLON® (i.e., fluorocarbon polymers), (e.g., tetrafluroethylene and fluorinated ethylene propylene). The interior surface 25 of the bowl 24, which contacts the batter or dessert composition, is covered with TEFLON® in the preferred embodiment to ease the removal of the baked or chilled product from the bowl. The radial sloping of the inner wall 25 further eases removal of the final dessert composition. It will be appreciated by those skilled in the art that other shapes and geometries of pan assemblies are possible, and that the specifics of material of which it is made can be changed without departing from scope of the invention. For example, the mold may be formed as a cone, or other shape. Additionally, it can be stamped from a solid piece of material or spun from aluminum instead of formed from a sheet.

Figure 8:
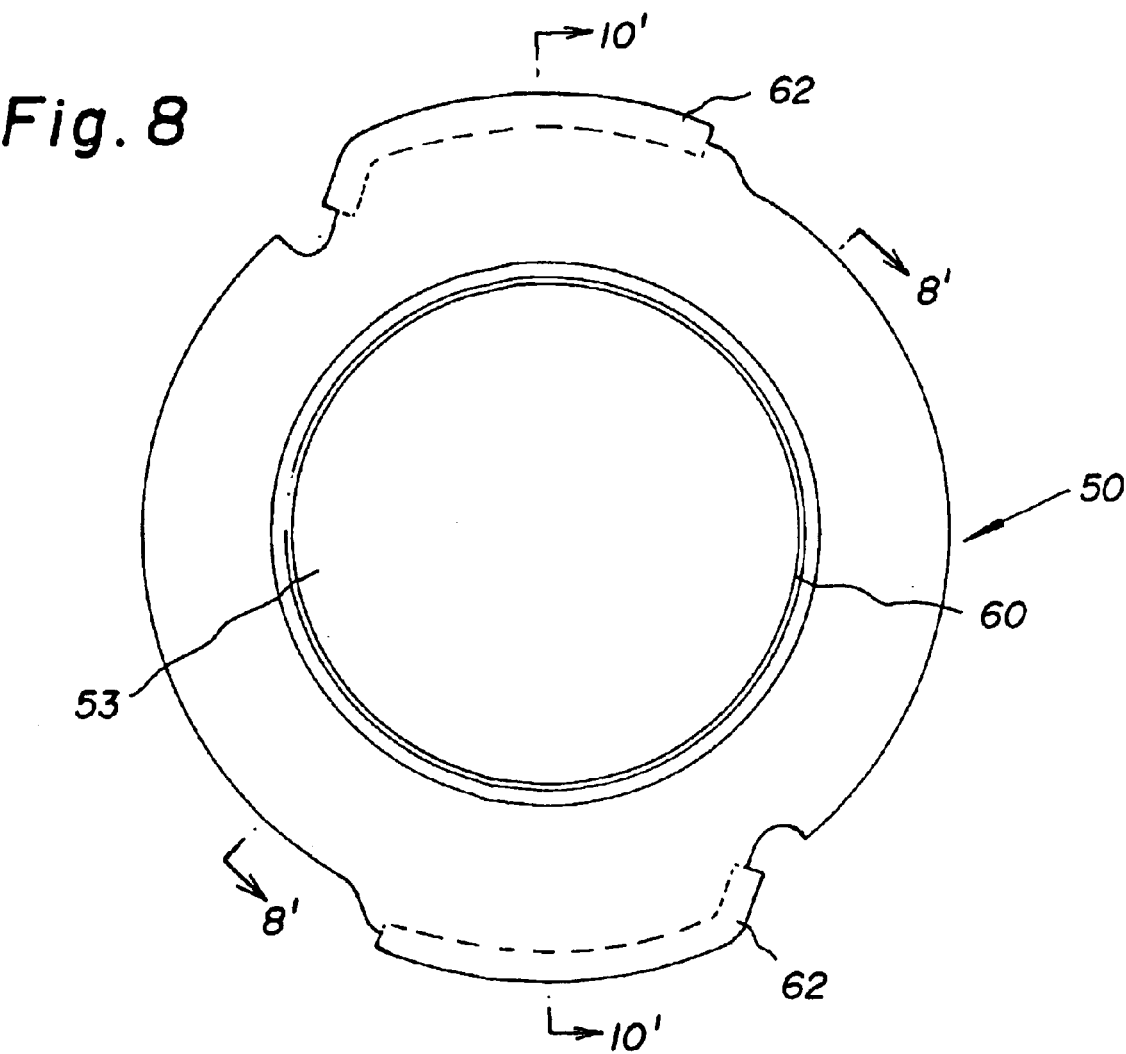
FIG. 8 is a top plan view of the cover and integrally formed inner bowl component.
Figure 11:
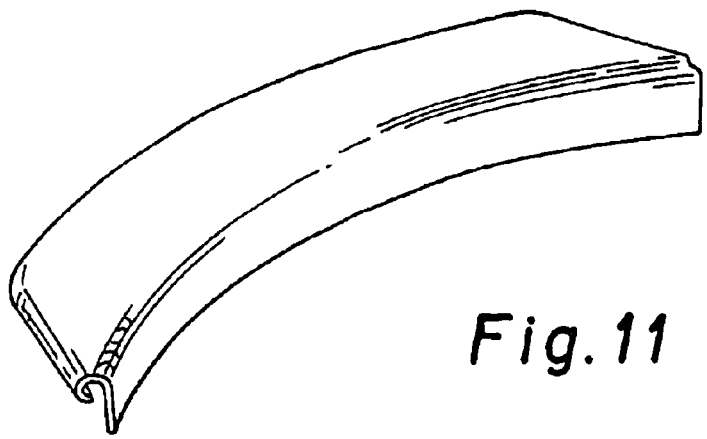
FIG. 11 is a perspective view of the handle of the outer dome bowl component.
Figure 13:
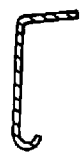
FIG. 13 is a cross section of the handles of FIG. 12 taken across line 13'—13'.
Figure 12:
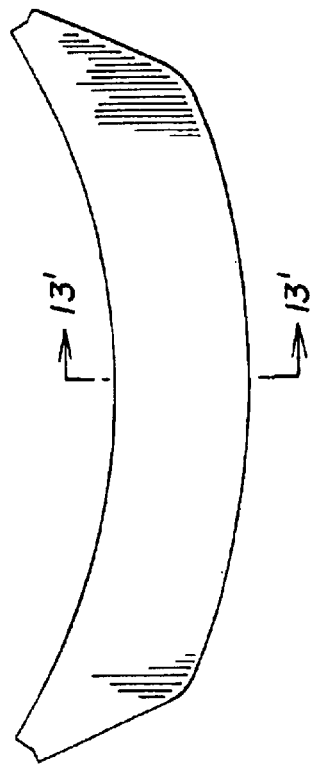
FIG. 12 is an enlarged top plan view of the handles for the outer dome bowl component.
Figure 9:
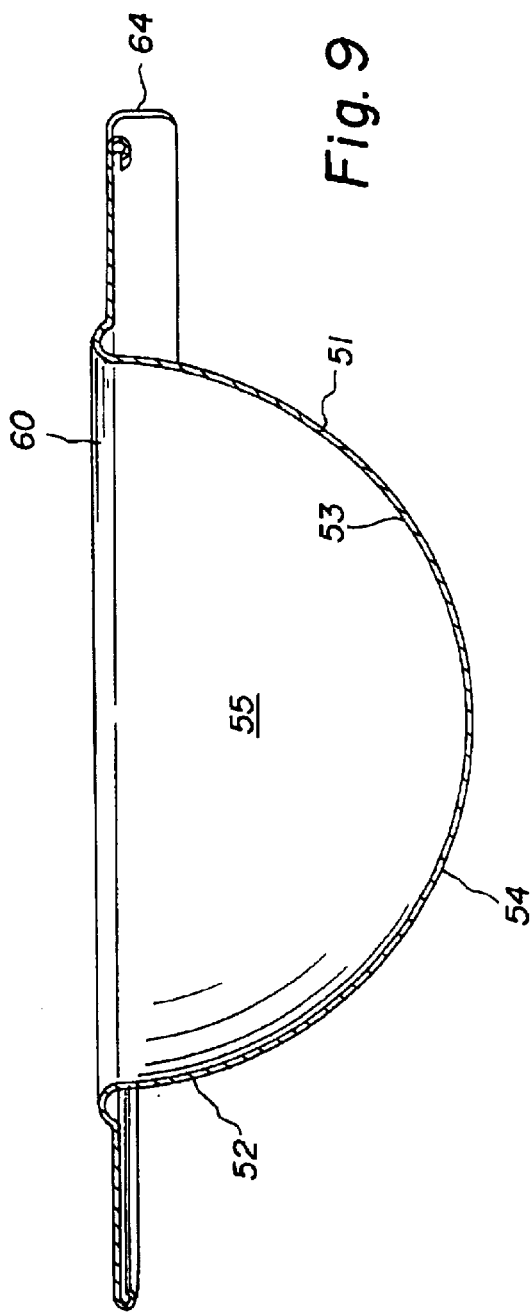
FIG. 9 is a cross sectional view of the cover and integrally formed inner bowl component taken along line A—A of FIG. 8.

The cover 50 has an integral curved bowl 51 as shown in FIGS. 8 through 10. The inner dome bowl 51 is typically symmetrical with a concavo-convex spherical shape constructed with a bowl body 52 having a spherical or curved closed bottom surface 54 and an open end 60 forming chamber 55. The bowl body 52 extends away from cover 50 so that it will be seated in cavity 29. The cover 50 is substantially circular shaped with handles 62 which are shaped to fit over the outer bowl handles 31. The ends 64 of the handles 62 are rolled or bent in a "C" configuration as shown in FIG. 8 so that the bottom portion 66 fits under the lower surface of handles 31 of the bowl, locking the same in position.

If desired, the cover 50 and inner bowl 51 can be constructed of porous material such as high temperature TEFLON coated high temperature fiberglass ranging from 5 to 10 mils in thickness or a stainless steel wire cloth also TEFLON coated on both sides, both of which are breathable an allow an air flow of 50 CFM which vents moisture during baking without batter coming through. The porous material has a sieve opening for the stainless steel wire cloth ranging from 0.0165+ or −0.0005 and the stainless steel is STME 1187. The inside and outside surfaces of the bowl 52 are preferably coated with one or more nonstick coatings, such as for example TEFLON® (i.e., fluorocarbon polymers), (e.g., tetrafluroethylene and fluorinated ethylene propylene). Alternately the bowl body 51 can be constructed of sheet steel, stainless steel, copper, aluminum, cast iron, pyrex, glass, porcelain, ceramic or any type of microwaveable material at a uniform desired thickness commonly used for baking pans and containers.

The interior surface 53 of the bowl 51, which contacts the batter or dessert composition is smooth and is covered with TEFLON® in the preferred embodiment to ease the removal of the baked or chilled product from the bowl. The radial sloping of the inner wall 53 further eases removal of the final dessert composition. It will be appreciated by those skilled in the art that other shapes and geometries of pan assemblies are possible, and that the specifics of material of which it is made can be changed without departing from scope of the invention.

Figure 14:
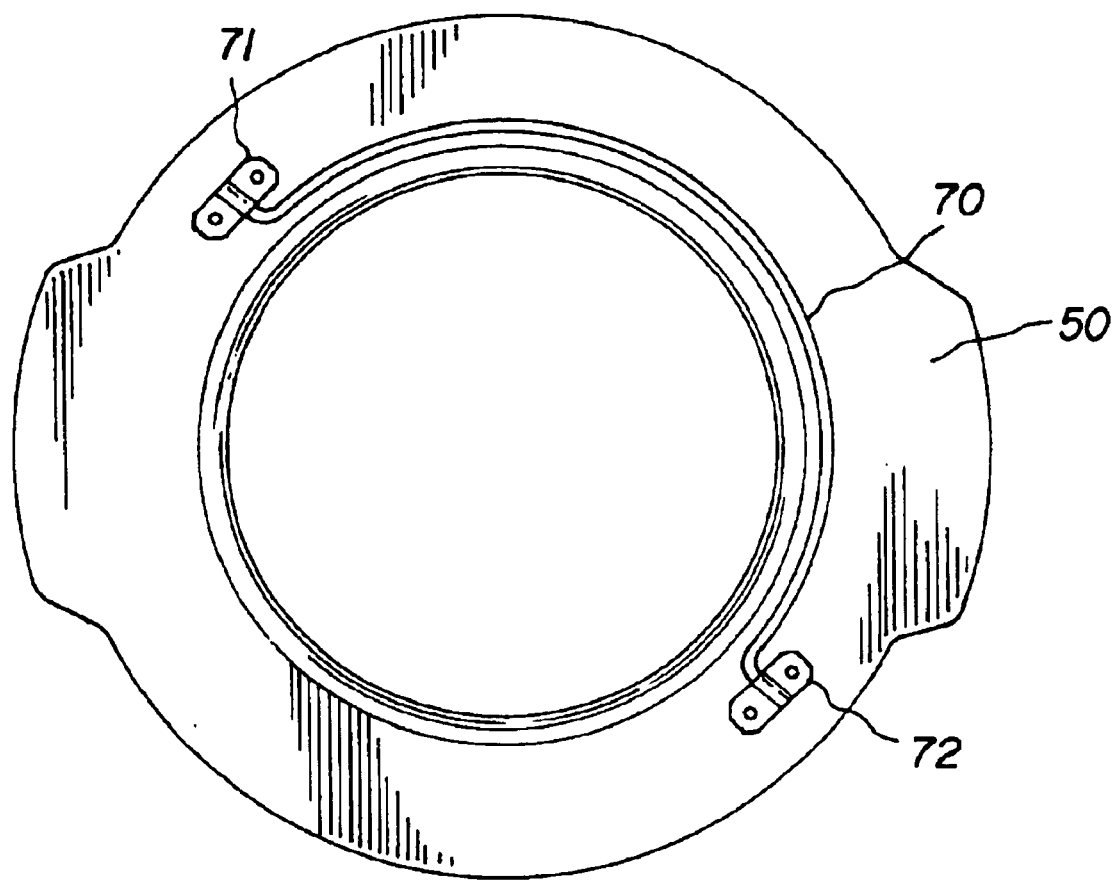
FIG. 14 is an alternative embodiment of the cover and integrally formed inner bowl component.

The inner bowl 51 is mounted in the outer bowl cavity 29 by placing the cover 50 on the rim 30 so that the handles 62 are offset from the outer bowl handles 31. The cover 50 is then rotated so that the ends 64 of the handles 62 engage the outer bowl handles 31 so that the bottom portion 66 are positioned under the bottom surface of outer bowl 31. In an alternative embodiments as shown in FIG. 14, a wire handle member 70 can be optionally mounted in yokes 72 which are mounted to the top surface of the cover 50. The handle is of a curved shaped with end sections 71 extending outward to fit into the yokes. The handle 70 can be rotated upward to allow twisting and removal of the cover 50 from the dome bowl 24.

In operation cake batter is poured, about ⅔ to ¾ full, in the bowl body 24 and the cover 50 and its integral inner bowl 51 is placed in chamber or cavity 29 of the outer dome pan 22 down into the batter in chamber 29 and the cover rotated so that both handles are aligned and locked. A second cake batter of a different flavor as for example chocolate is poured in the chamber of bowl 51 about ⅔ to ¾ of the depth of the bowl 52.

After the batter 24 is molded and baked by the application of heat to the bowls, the cover 50 is removed and the inner dome mold is taken out of its nesting position in the outer mold bowl 24 leaving a cavity in the cake. The TEFLON® coating of the interior and exterior surface of the inner mold bowl 51 facilitates removal of the mold without tearing or damaging the final baked product. The baked cake is then removed from the inner mold bowl body 51, the TEFLON® coating of the interior surface of the inner bowl mold facilitating the dessert removal. The result is a baked goods, which is hemispherically shaped and ready to eat. The TEFLON® coating of the interior surface 25 of the outer dome mold 24 facilitates removal of the baked product without tearing or damaging the final baked product. The interior cake or other optional filling is then placed in the cavity formed by inner mold bowl body 51 and the composite assembly is inverted onto a serving area for frosting, icing or other decoration preparatory to being served. The result is a covered dual domed cake or dessert which is domed shaped as a hemisphere and ready to eat. The baked goods may be filled or coated with ice cream, pudding, icing or other sweet filling for a dessert pastry.

Although aluminum, sheet steel and/or stainless steel is preferred for the concavo-convex outer bowl body, any suitable structural material could be used in its place, as for example, alloyed steel, copper, brass, cast iron or even glass or ceramic, such as stoneware. The inner bowl body has the same structural body as that of the preferred embodiment.

The principles, preferred embodiments and modes of operation of the present invention have been described in the foregoing specification. However; the invention should not be construed as limited to the particular embodiments which have been described above. Instead, the embodiments described here should be regarded as illustrative rather than restrictive. Variations and changes may be made by others without departing from the scope of the present inventions defined by the following claims.

What is claimed is:

1. An apparatus assembly for forming a compound dessert in a predetermined shape comprising:

a first outer mold comprising a dome shaped bowl with a closed semi-spherical end and an open end defining a cavity, handles mounted to said bowl, a support base secured to said closed end of said outer bowl body, said open end defining a lip extending outward from said bowl open end; and a cover assembly comprising a closure member defining a second inner mold, said second inner mold comprising a dome shaped bowl with a closed semi-spherical end and an open end of lesser diameter then said first outer mold defining a cavity, said closure member being provided with handles which are adapted to be rotatably mounted to said outer mold bowl handles to allow the first outer mold bowl and closure member to be secured together to provide a fixed registration of the position of the inner mold bowl in the outer mold bowl, and allowing said closure member to be rotated in an opposite direction to be removed from said first outer mold bowl.

2. An apparatus assembly as claimed in claim 1 for forming a compound dessert in a predetermined shape wherein an inner surface of said first outer mold bowl and said second inner mold bowl and an outer surface of said second mold bowl are coated with a nonstick material.

3. An apparatus assembly as claimed in claim 2 for forming a compound dessert in a predetermined shape wherein said nonstick compound is tetrafluroethylene.

4. An apparatus assembly as claimed in claim 2 for forming a compound dessert in a predetermined shape wherein said nonstick compound is fluorinated ethylene propylene.

5. An apparatus assembly as claimed in claim 1 for forming a compound dessert in a predetermined shape comprising wherein said support base is a ring member having an arcuate side wall and a planar bottom surface.

6. An apparatus assembly as claimed in claim 5 for forming a compound dessert in a predetermined shape wherein said ring member has a plurality of tabs extending away from an axis taken through the center of the ring member.

7. An apparatus assembly as claimed in claim 6 for forming a compound dessert in a predetermined shape wherein said tabs are positioned on an edge of said ring and are located 90° from each other.

8. An apparatus assembly as claimed in claim 6 for forming a compound dessert in a predetermined shape wherein said tabs extend outward from an axis through the center of the ring member at an angle ranging from about 120° to about 130°.

9. An apparatus assembly as claimed in claim 1 for forming a compound dessert in a predetermined shape wherein said closure member handles are adapted to be mounted around a lower outer surface of said first outer bowl handles.

10. An apparatus assembly as claimed in claim 9 for forming a compound dessert in a predetermined shape wherein said closure member handles have a downwardly curved end section with an end section directed back toward said second inner mold which fits around the distal ends of said outer mold bowl handles.

11. An apparatus assembly as claimed in claim 1 wherein said inner mold bowl of said cover assembly is constructed of a porous material allowing airflow therethrough while preventing a food composition positioned adjacent said bowl from flowing therethrough.

12. An apparatus assembly as claimed in claim 1 wherein a non-stick material is coated on an outer surface and an inner surface of said inner mold bowl.

13. An apparatus for forming a foodstuff in a predetermined shape comprising:

a first hemispherical shaped outer bowl having a lip extending around its outer circumference and a base secured to its bowl;

a cover assembly mounted to said outer bowl, said cover assembly comprising a second hemispherical shaped inner bowl which is adapted to be mounted in said outer bowl and a skirt member extending from the circumference of said inner bowl so that when said cover assembly is mounted to said outer bowl said first and second bowls are mounted together in a nesting relationship, said skirt member being formed with opposing handles, each of said handles defining a curved flange which engages said outer bowl; and integral fastening means formed on said skirt member holding said inner bowl in a spaced fastened position in relation to said outer bowl and engaging said outer bowl lip.

14. An apparatus as claimed in claim 13 wherein said curved flange has a cross section which is substantially "C" shaped.

15. An apparatus as claimed in claim 13 wherein an inner surface of said first outer mold bowl and said second inner mold bowl and an outer surface of said second mold bowl are coated with a nonstick material.

16. An apparatus for forming and baking batter in a predetermined shape comprising:

a first hemispherical outer baking bowl having a lip extending around its outer open circumference and handles extending from said baking bowl, a ring shaped base mounted to an outer surface of said bowl;

a cover assembly with an integral second hemisphere inner baking bowl which is adapted to be mounted to said outer baking bowl with the inner baking bowl being positioned within the cavity of said outer baking bowl, said cover assembly comprising a substantially circular cover member extending outward from the inner baking bowl which extends past the inner diameter of said outer baking bowl;

said cover member defining said handle means in the form of an end flange bent downward and back towards said inner baking bowl to engage said handles of said outer baking bowl and fasten the cover assembly to said outer baking bowl.

17. An apparatus as claimed in claim 16 for forming a compound dessert in a predetermined shape wherein said outer and inner bowls are coated with a nonstick material.

18. An apparatus as claimed in claim 16 for forming a compound dessert in a predetermined shape wherein said inner bowl has its inside surface and outside surface coated with a nonstick material.

19. An apparatus assembly as claimed in claim 16 wherein a rotatable handle member is mounted to the top surface of said circular cover member.

20. An apparatus assembly as claimed in claim 19 wherein said handle member is an arcuate wire with a circular cross section.

* * * * *